US008122041B2

(12) United States Patent
Kamireddy et al.

(10) Patent No.: US 8,122,041 B2
(45) Date of Patent: Feb. 21, 2012

(54) SHARING AND COLLABORATION OF SEARCH FINDINGS

(75) Inventors: Sreeharsha Kamireddy, Redmond, WA (US); Cory Hicks, San Jose, CA (US); Michael Schechter, Sammamish, WA (US); Rick Gruenhagen, Woodlinville, WA (US); Ramez Naam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/437,785

(22) Filed: May 8, 2009

(65) Prior Publication Data

US 2010/0287183 A1 Nov. 11, 2010

(51) Int. Cl.
*G06F 7/00* (2006.01)
*G06F 17/30* (2006.01)

(52) U.S. Cl. ........ 707/759; 707/769; 707/770; 709/206; 709/245; 709/246

(58) Field of Classification Search .................. 707/759, 707/769, 770; 709/206, 245, 246
See application file for complete search history.

(56) References Cited

U.S. PATENT DOCUMENTS

| | | | |
|---|---|---|---|
| 6,493,702 B1 | 12/2002 | Adar | |
| 7,082,439 B1 * | 7/2006 | Hickman et al. | 707/999.104 |
| 7,243,102 B1 * | 7/2007 | Naam et al. | 707/999.006 |
| 7,305,427 B2 * | 12/2007 | Kaye | 709/203 |
| 7,363,296 B1 * | 4/2008 | Naam et al. | 707/999.003 |
| 7,440,952 B1 | 10/2008 | Satoh | |
| 7,725,526 B1 * | 5/2010 | Kraft | 709/203 |
| 7,925,649 B2 * | 4/2011 | Jeh et al. | 707/722 |
| 2002/0059425 A1 * | 5/2002 | Belfiore et al. | 709/226 |
| 2003/0046281 A1 * | 3/2003 | Son | 707/6 |
| 2004/0193691 A1 * | 9/2004 | Chang | 709/206 |
| 2006/0112081 A1 * | 5/2006 | Qureshi | 707/3 |
| 2006/0224583 A1 | 10/2006 | Fikes | |
| 2007/0043712 A1 * | 2/2007 | Ramberg | 707/3 |
| 2007/0233671 A1 * | 10/2007 | Oztekin et al. | 707/5 |
| 2007/0282836 A1 * | 12/2007 | Son | 707/6 |
| 2008/0033970 A1 | 2/2008 | Jones | |
| 2009/0234876 A1 * | 9/2009 | Schigel et al. | 707/102 |
| 2009/0276408 A1 * | 11/2009 | Auerbach et al. | 707/3 |

FOREIGN PATENT DOCUMENTS

EP 1030247 A2 8/2000

OTHER PUBLICATIONS

Kwok et al.—"A Software as a Service with Multi-tenancy Support for an Electronic Contract Management Application"—Services Computing, Jul. 7-11, 2008, SCC'08, 2008 IEEE International Conference on Services Computing (pp. 179-186).*

(Continued)

*Primary Examiner* — John E Breene
*Assistant Examiner* — Anh Ly
(74) *Attorney, Agent, or Firm* — Shook Hardy & Bacon L.L.P.

(57) ABSTRACT

Sharing of search histories is facilitated with a computer based system and method that allow a searcher to share search results generated without prior authentication of an identity with a search engine. Sharing and collaboration are further facilitated by allowing search history items to be shared with a minimum of additional searcher input. Context for the search history items is provided by associating a search query with an accessed document link without requiring separate tagging of the link by the searcher.

16 Claims, 12 Drawing Sheets

OTHER PUBLICATIONS

Kumar et al. "Web Mining—Concepts, Applications and Research Directions"—Foundations and Advances in Data Mining: Studies in Fuzziness and Soft Computing, 2005 vol. 180/2005 (pp. 275-307.*

"Hooeey Tracks your Browsing History," http://www.techmixer.com/hooeey-tracks-your-browsing-history/, May 8, 2009.

"Yahoo Introduces 'Social' Search Engine," http://www.pcworld.com/article/121651/yahoo_introduces_social_search_engine.html, May 8, 2009.

"SearchTogether: An Interface for Collaborative Web Search," http://research.microsoft.com/en-us/um/people/merrie/papers/searchtogether.pdf, May 8, 2009.

"Google Shared Stuff," http://googlesystem.blogspot.com/2007/09/google-shared-stuff.html.

"Exploiting Personal Search History to Improve Search Accuracy," http://pim.ischool.washington.edu/pim06/files/shen-paper.pdf, May 8, 2009.

* cited by examiner

SHARING AND COLLABORATION OF SEARCH FINDINGS

BACKGROUND

Search engines are now capable of providing users with information from a wide variety of sources. Because of the amount of information available, groups of users may want to coordinate their searching efforts. Coordinating a search effort can allow a group of users to reduce the workload on each user, by avoiding duplication of effort in identifying valuable information.

SUMMARY

In various embodiments, a computer implemented method and system are provided to facilitate sharing of search history data. The system and method avoid the need for having a searcher log in to a particular system prior to performing a search that will be shared. Instead, a searcher can perform a search without prior authentication of identity. Once the searcher has identified a search history item for sharing, the searcher can select a recipient and share the search history item. The search history item can include a search query and documents viewed by the searcher that are associated with the search query. Additional streamlining can be achieved by implicitly tagging pages visited with the search query that was used to identify the page. This allows search history information, including the context of the search query, to be quickly forwarded to another user. The method and system are compatible with additional features, such as allowing a user to add further comments regarding an item in the search history. However, such additional optional features do not need to be used in order to provide a contextual search history to another user.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
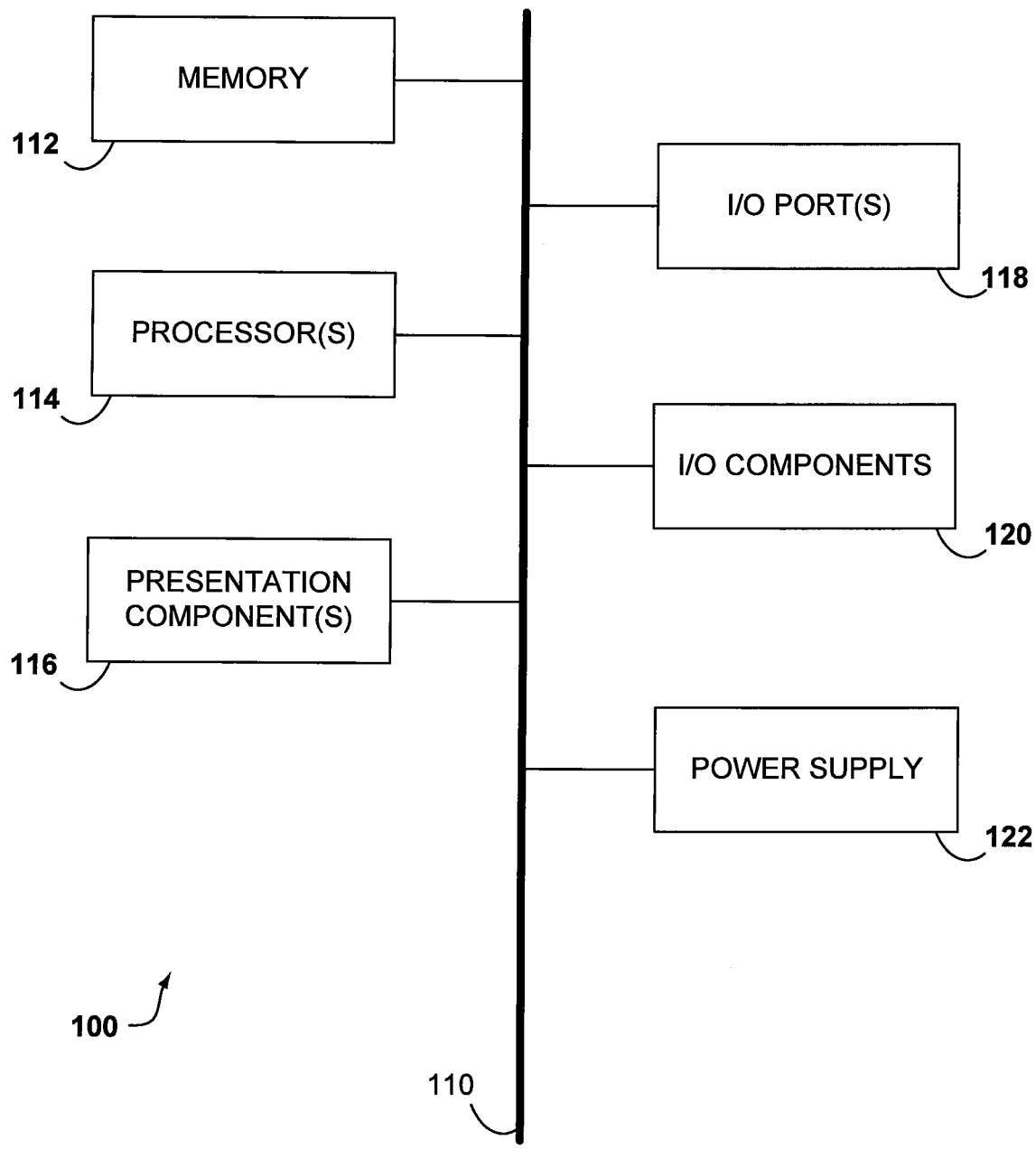
FIG. 1 is a block diagram of an exemplary computing environment suitable for use in implementing embodiments of the present invention.

Due to the amount of content available via internet web documents, it is increasingly common that submitting a search query to a search engine will result in a large number of results. Identifying the most useful documents returned by a search engine can be an unwieldy task for a single person. Collaboration between a group of searchers is one way to handle the large amounts of data that are available. The search query itself often provides enough context to allow searchers to collaborate. However, a searcher may not know ahead of time that a search query will need collaborative review in order to effectively review the results, or the searcher may simply want to defer making a decision on collaboration. The various embodiments of the invention, including the examples below, provide a method that allows a searcher to easily share results without having to identify ahead of time that collaboration is desired.

In an embodiment, a computer based method is provided for sharing contextual search history results. The method begins when a search query is received from a searcher. Documents available on the web that match the search criteria are returned to the searcher as a series of links. A "click-through" is then received for at least one of the documents. This means that the searcher has selected the link, causing the browser display the selected document. The search query and the at least one link corresponding to a selected document are stored so that the search query and the at least one selected document link are associated. After storing the search query and at least one associated document link, the availability of a predetermined list of contacts or potential recipients is detected. Additionally, selection information is received for selecting a search query and for selecting a recipient from the predetermined list. The selected query and at least one associated document link are then transmitted to the selected recipient. By associating the document links with the search query, a search history can be forwarded that provides context to the recipient without requiring the searcher to individually tag or otherwise describe the document links.

In other embodiments, a computer based system and method are provided that allow a searcher to share search history information with a recipient based on an abbreviated number of user actions. In such embodiments, an abbreviated number of user actions means that the search service allows the searcher to share the search history information while having to perform only a limited number of actions within the search service. In an embodiment, a searcher can identify a search query and a at least one document link that is desirable to share with a recipient. At this point, the searcher decides to share this search history. The searcher then authenticates an identity with a service that includes a predetermined potential recipient list. The service can correspond to the search service, or the service can be another service such as an e-mail service or a social networking service.

After authentication, the searcher can transmit the search history information by performing only two or only three additional user actions. An example of a user action can be selecting an item from a drop down menu or clicking on an action button or link. Typing a character from an input device such as a keyboard could also be a user action. Note that with regard to characters from a keyboard, typing both the "Shift" key and a letter key in order to achieve a capital letter as input would be considered a single user action. Similarly, typing both the "control" key and a letter key would be considered a single user action. The abbreviated number of user actions represent the small number of actions required for a searcher to transmit a search history after identity authentication. Note that actions performed by the searcher outside of the search service after any identity authentication are not relevant to the sharing of search history. Thus, with regard to the use of the phrase "consisting essentially of", any actions performed outside of the search service after identity authentication are should be considered as non-essential activity which may or may not be performed without affecting the abbreviated number of user actions. With regard to the use of the phrase "consisting essentially of", activities within the search service of submitting a search query and selecting a document link represent activities that precede the abbreviated number of user actions. With regard to the use of the phrase "consisting essentially of", any activity related to adding additional searcher information regarding a search query or document link is an excluded activity. In embodiments involving an abbreviated number of user actions, one of the benefits achieved is that context based search history information may be shared without having to separately tag individual search history items.

Various examples of an abbreviated number of user actions are possible. The abbreviated number of user actions may optionally include receiving a user action to select a link or button to display a primary history interface. This action corresponds to the situation where the functionality for sharing search history is not located in every history interface that is displayed. In embodiments where a smaller history interface is displayed on a search results page, the history interface may include a link to the main history interface rather than the links and/or buttons and/or other objects necessary for transmitting search history items. The abbreviated number of user actions may further include selection of a recipient from the predetermined list of user recipients. The abbreviated number of user actions can also include receiving an instruction from the searcher to save a search query history, to transmit a search query history, or to save and transmit a search query history.

Identification of Contacts List

In various embodiments, the predetermined list of contacts or potential recipients is detected after the search is performed. The contact list is not detected until after the search is performed due to the fact that the searcher has not previously authenticated an identity with either the search service or a third party service. Authenticating an identity may be accomplished by any convenient means, such as by providing a user identification and a password to a service. For example, the service could be a search and mail provider, such as the services available under login to a Windows Live™ account, which offers access to a search service, an e-mail service, the Instant Messenger™ service, and a variety of other services. In this embodiment, the predetermined list could be the contacts in the e-mail address book, a contact list from the Instant Messenger service, or any other predetermined list of internet contact information. Another option would be to login to a social networking service. In such an embodiment, a listing of "friends" on the social networking site could be used. Yet another option would be to login to an account associated with only the search service, or to login to an account associated with just a mail provider. Still other options will be apparent to those of skill in the art.

In various embodiments, the detection of the predetermined list of contacts occurs based on when the searcher decides to login to an appropriate service. In such embodiments, a searcher does not login to the service having the desired predetermined list until after a search has been performed. This allows a searcher to defer the decision to collaborate until after a useful search query has been identified. This also means that searchers who have different contact lists with different services can select the appropriate contact list after the search has been performed. Note that this feature is compatible with systems that allow for detection of a predetermined list prior to searching. By combining an embodiment of the invention with a system that also allows for detection of a predetermined list prior to searching, a system can be provided where a searcher has the flexibility to choose when to provide authentication for a service containing a contact list.

In still other embodiments, search history can be shared without any authentication by the searcher. In such embodiments, a recipient can be identified by directly providing the search service with a recipient address for transmittal of a search history item. Preferably, the recipient address is an address corresponding to an identity for the recipient with a computer based service, such as an e-mail service or a social networking service. In such an embodiment, the search history item is transmitted to the recipient address in a standard form, such as in an e-mail form. Optionally, if a preferred message format can be identified from the nature of the recipient address, the message can be transmitted according to the preferred message format.

Search Service

In various embodiments, a computer based method according to the invention can be implemented as part of a search service for accessing a search engine. The search engine can be a conventional search engine. The service for accessing the search engine can provide a query interface for accessing the search engine. The query interface can be displayed as a web page, or as part of a web page. Preferably, the page displaying the query interface can also display a history interface, for displaying information about search queries that have been previously entered by the searcher. The instance of the search service used by a searcher can be located remotely, such as at the location of the search engine. Alternatively, the instance of a search service used by a searcher can be local to the searcher's computing device.

For queries that are submitted using the query interface, the query is stored in a query history database. The query is also submitted to the search engine, which provides a listing of document links that are responsive to the query. These document links are displayed to the user in any convenient format. When a searcher selects, or "clicks-through", a document link that is displayed as responsive to a search query, the document link is also stored in the query history database. The selected document link is stored in a manner so that the document link is associated with the search query.

In addition to storing a query and associated document links, the database can store additional optional information supplied by the searcher regarding either the query or the document links. Optional information could include comments by the searcher regarding a document link, or comments regarding the search query. Another optional choice for a searcher would be to modify the list of associated documents. For example, the searcher may remove the association of a document link with a particular query. When this occurs, the document link is no longer displayed in the history in association with that query. Alternatively, if more than one query is available in the search history, documents from a first query may be associated with a second query.

In some embodiments, a series of database or storage structures can be used. Although these database or storage structures are describes as separate objects, the storage capabilities may be implemented in any convenient manner in any desired number of storage or database structures. A type of query history database has been described above. Optionally, more than one type of query history database may be available. A first query history database may be a general database associated with the particular instance of the search service. No authentication or other identifying information is required to access this type of query history database. This type of query history database tracks search query history during the instance of the search service. The database can be cleared when the instance is closed. Alternatively, if the database is stored locally, each instance of the search service on the local computer can access the database.

A second type of query history database is a query history database associated with an authenticated searcher. Authentication can occur by any convenient method, such as by having a searcher log in to the search service. This authenticated query history database can be stored in a manner so that the search query history is available to the searcher after login to the service. The authenticated query history could be stored at a central location, or the authenticated query history could be stored locally. In the event of local storage, access to the authenticated query history may require both authentication by a searcher and access to the local storage. In addition to storing search queries and associated document links, the authenticated query history may also store one or more indications for each query and/or document link, such as an indication of whether the query and/or document link has been shared with another person, or an indication of whether the query and/or document link was received from another person. Upon authentication, the search service can incorporate any history items existing in the query history for the current instance of the search service into the authenticated query history. Optionally, the search service can prompt the user prior to incorporating the existing history items into the authenticated query history.

In some embodiments, a third type of query history database is an outside recipient database for a query history that is shared with a recipient outside of the search service. This can be generally referred to as an outside recipient data location. When a query history item is shared with a recipient by an e-mail service, a message service, a social networking service, or another type of service, the query history item may be shared by transmitting a document link to the recipient. The document link provides the recipient with access to a page based on a query history stored in this database. The page includes the search service features, such as the query interface and history interface. The page also lists the received query and the associated document links. Depending on the embodiment, the outside recipient database could be used to store query histories forwarded to outside services, to store query histories forwarded by a searcher that has not authenticated with the search service, or both. Preferably, the outside recipient database stores search history items in a manner that allows for consecutive retrieval by the searcher and recipient. For example, the outside recipient database can store the search history item along with a unique code. The unique code can be used as part of a web page location. This allows the stored history item to be viewed multiple times, including storing any updates to the history item that may occur as the information is reviewed.

In various embodiments, a history interface is displayed on the same web page as the query interface. The history interface can be displayed as a portion of a web page showing the query interface and/or a listing of results responsive to a query. Alternatively, the history interface can be provided as a separate history page. The content of the history interface can vary according to the amount of space available and the desired method for allowing access to the history module. For example, a smaller history interface can be presented on a page displaying search results. The smaller interface may contain only the prior queries and a link for accessing a main history page. The main history page would then provide a more detailed view. For example, the main history page could provide a listing of stored queries and associated document links, buttons or other action items to allow for changes in the association of a document link with a given query, buttons or other action items to allow for saving and/or sending of query history items, and lists of potential recipients for history items.

Access to the predetermined lists in a service can be provided via application program interfaces (API) with the relevant service. The search service includes application program interfaces with any desired outside services that can receive a query history message. The application program interfaces can allow the search service to identify a predetermined list of recipients with the outside service. The application program interfaces can also allow the search service to transmit a message to a selected recipient according to the format required for the outside service. Examples of outside services which can be accessed via an application program interface include services where an authenticated user can send and receive messages. These can include e-mail services, social networking services, messaging services, and other related services.

Sharing of Search Information

The method of collaboration using the invention will vary depending on how history information is shared. In some embodiments, search history information is shared outside of the search service. For example, search history information could be sent to an e-mail account, to a social networking site account, or to any other service capable of receiving a message. One way of transmitting search history information to such outside accounts is to simply include the search history information in the message.

Alternatively, when sharing with an outside service, the content of the message could simply be a link to a page or document accessible via a browser over a network, such as a wide area network like the world wide web. The document can contain the search history information forwarded by the searcher to the recipient. For example, the document can contain the search query, the associated document links, and any additional optional comments added by the searcher. The search history document can present the search history information in a format so that selecting the document links allows access to the corresponding documents. The search history document can also present the search history information so that selecting the search query accesses the original search engine and returns the responsive list of documents for that query. Preferably the search would be performed again by the search engine, but optionally the prior result could be stored and displayed when the search query is selected.

Preferably, the document is an instance of the search service. In such embodiments, if the search query is accessed and additional documents are viewed, the search history is updated to reflect that additional document links are associated with the query. Preferably, the document is accessed in a manner that allows both the searcher and the recipient to visit the document more than one time, with each visit maintaining the search history of both users, as well as any comments provided by the users. For example, the search history can be stored in the outside recipient database in connection with a unique identifier that can be incorporated into a web address to allow repeat access to the particular history information. In this situation, the outside recipient database performs a function similar to the authenticated searcher database, with the unique identifier playing the role of the authentication information. Optionally, access to a search history item in the outside recipient database can require both a unique identifier and a separate authentication, such as authenticating an identity with the search service.

In embodiments where search history information is shared within a service corresponding to the search engine, the search history information may be shared directly with the recipient's history module. In such embodiments, both the searcher and the recipient have access to the search service. When the searcher desires to transmit the search history to a recipient, the recipient's account with the search service is selected. Because both accounts are within the search service, the search history data can be transmitted to the recipient in the form of history data that can be incorporated into the recipient's history. Optionally, the recipient can be required to approve incorporation of the received search history data into the recipient's history page.

After receiving the search history data from the searcher, the recipient can view the search history data in the same manner as if the recipient performed the search. Optionally, the history module can note that a search was received from another person, or the history module can show that a search represents a shared history item. Otherwise, the received search history item can be used like other history items. For example, the received history item will be displayed as a search query and one or more associated document links. If the search query is selected, a list of document links corresponding to responsive documents is returned by the search engine. If a document link is selected, the list of document links associated with the query is updated to reflect the additional document.

Because the searcher is sending the search history data to the recipient at an account corresponding to the search service, the data can be transmitted in a format suitable for incorporation into the recipient's search history. For example, the search history data within the search service is stored in a type of database. The search history data can be sent in a format to simply add the search history data to the appropriate database. Alternatively, the search history data can be added using the typical history function of the search service. When a query is submitted to the search service, the query is stored. The document links visited are also stored. The search history data from the searcher can be processed into the recipient's history using the existing routines for storing submitted queries or visited documents. Note that in another embodiment, two searchers with accounts corresponding to the search service can also share history information using the outside recipient database. Other methods for incorporating a search history into a recipient's history will be apparent to those of skill in the art.

After receiving search history items, a recipient may modify the search history items and/or click on additional document links that are responsive to the search query. This will modify the search history as sent by the original searcher. This modified history can then be sent back to the original searcher, thus completing the loop for collaboration.

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
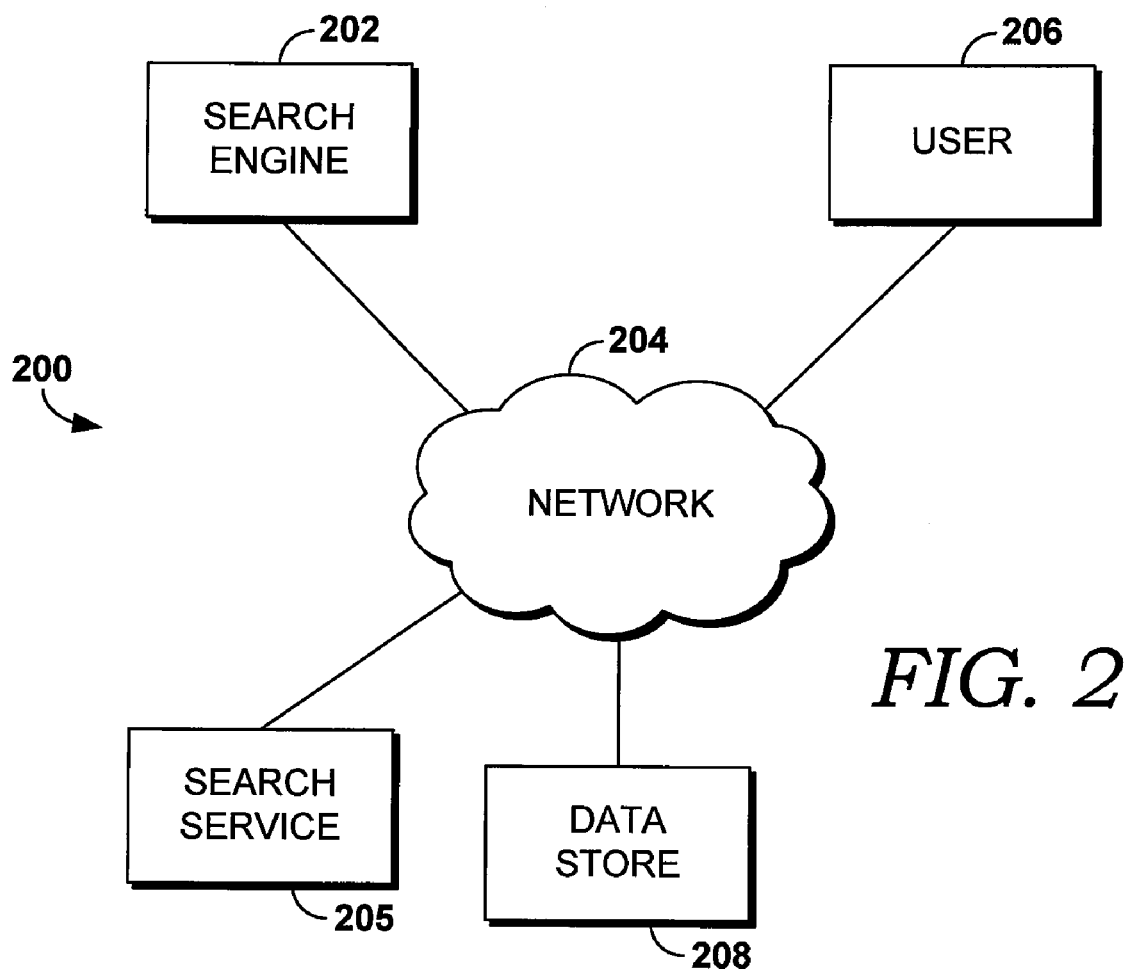
FIG. 2 is a block diagram of an exemplary computing system suitable for obtaining user preferences and presenting search results respectively ordered utilizing user preferences, in accordance with an embodiment of the present invention.

Embodiments of the present invention relate to systems and methods for sharing search history information between searchers to facilitate collaboration. Turning now to FIG. 2, a block diagram is illustrated, in accordance with an embodiment of the present invention, showing an exemplary computing system 200 configured to facilitate sharing of search history information. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes a user device 206, a search service 205, a search engine 202, and a data store 208, all in communication with one another via a network 204 and/or via location on a common device. The network may include, without limitation, one or more local area networks (LANs) and/or wide area networks (WANs). Such networking environments are commonplace in offices, enterprise-wide computer networks, intranets and the Internet. Accordingly, the network 204 is not further described herein.

The data store 208 is configured to store information related to search queries and document links associated with a search query. As noted above, a document link is associated with a search query when a search query is provided by a searcher, a document link is returned as being responsive to the query, and the responsive document link is accessed by the searcher. The data store may also store other information regarding a search query and/or an associated document link. For example, the data store may contain information regarding searcher comments on a query or document link. The data store may also contain information regarding how a query and/or document link was added to the history, such as whether the document link was added to the history by receiving the link from another searcher. The data store may further contain information regarding whether a query and/or document link has been shared with another person. Though illustrated as a single, independent component, data store 208 may, in fact, be a plurality of data stores, for instance, a database cluster, portions of which may reside on the user device 206, the search engine 202, another external computing device (not shown), and/or any combination thereof.

Each of the user device 206 and the search engine 202 shown in FIG. 2 may be any type of computing device, such as, for example, computing device 200 described above with reference to FIG. 2. By way of example only and not limitation, each of the user device 206 and the search engine 202 may be a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., search queries, web page addresses, and the like. It should be noted, however, that the present invention is not limited to implementation on such computing devices, but may be implemented on any of a variety of different types of computing devices within the scope of embodiments hereof.

The search service 205 is configured to receive search queries input by a user (e.g., utilizing a keypad, mouse, or the like) and to transmit such search queries to the search engine 202. In turn, the search engine 202 is configured to receive the input search queries. The responsive document links returned by search engine 202 are provide to the searcher by search service 205 via user device 206. The search service 205 is further configured to store search queries input by a user in data store 208. When a user accesses a document link that is provided as being responsive to a search query, the search service 205 also stores the document link as associated with the query.

Figure 3:
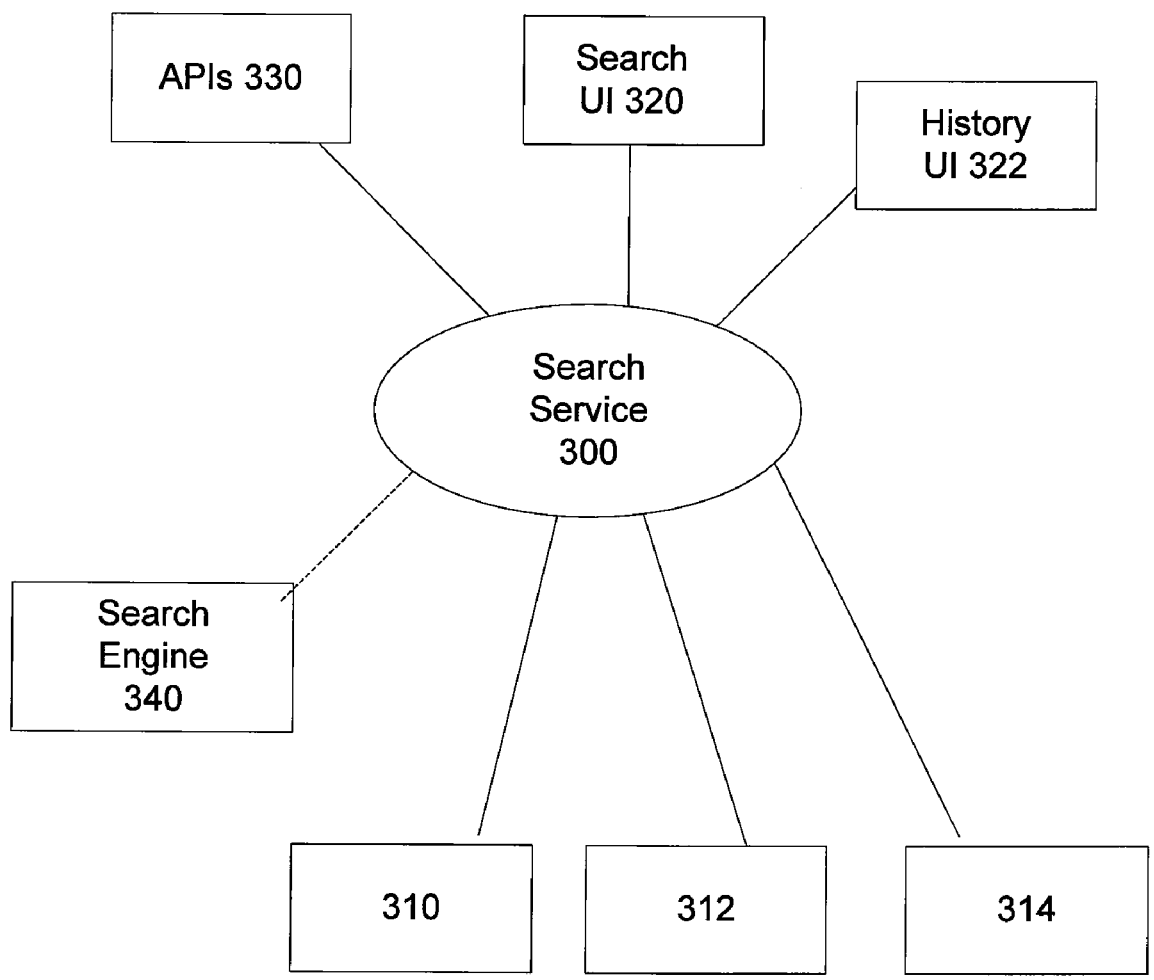
FIG. 3 schematically shows various components in an embodiment of a search service.

FIG. 3 schematically shows an example of a search service suitable for performing various embodiments of the invention. In FIG. 3, search service 300 is depicted as a central hub, with components, functions, and/or services of the search service shown on various spokes. Those of skill in the art will recognize that each of the components, functions, and or services within the search service may potentially interact with any other part, depending on the implementation of the search service. Thus, FIG. 3 is meant to schematically represent the various parts that work together, as opposed to implying a specific functional relationship.

In FIG. 3, search service 300 can include one or more databases. An exemplary embodiment is shown which includes three types of databases, data stores, or other structures for storing information. However, the three databases shown in FIG. 3 could be combined into a single data store, or they could be split up among multiple data stores. Database 310 represents a local instance search query database that can store query history items based on activity locally on a computing device. This database could store search queries from both authenticated and non-authenticated searchers. Database 312 represents an authenticated user database. This database stores search query history items for a searcher that has authenticated an identity with the search service. Such a database can be stored on a local computing device, or at a remote location to facilitate access to an authenticated searcher's history from any computing device. Database 314 represents an outside recipient database. The outside recipient database 314 allows search query history data to be stored in association with an identifier. The identifier can be used as part of a web address to allow one or more searchers to return to a query history saved in the outside recipient database.

Search service 300 also makes use of several user interfaces. Search interface 320 provides access for a searcher to the search engine. In an embodiment, the search interface can include a query box for allowing a searcher to enter a query for submission to the search engine. Display of responsive document links could also be achieved through the search interface 320, or a separate interface could be used if desired.

Note that search interface 320 may represent a series of different types of interfaces. For example, search interface 320 could include dedicated search query pages as well as providing a search query box as a portion of a page. In an embodiment, history interface 322 also can include more than one type of interface. On a page devoted primarily to providing a search query box or for providing responsive results, a reduced size version of a history interface can be provided that displays only the most recent query with a listing of several of the recently viewed document links associated with that query. This interface could also include a link to a more detailed version of the history interface 322. In the more detailed version of the history interface, an expanded view of search queries and associated document links can be provided. The more detailed view can include action buttons for modifying the document links associated with a search query, as well as an interface for adding comments for an item in the search history. The more detailed view can also include action buttons for saving the current status of a query history and sending a query history to an identified recipient. The query history to be sent and the recipient can be identified, for example, by drop down menus provided on the history page. On such a detailed history interface page, the search interface may include only a search query box. Those of skill in the art will recognize that the above interface descriptions are exemplary, and other types of interfaces may be implemented to facilitate use of the search and history portions of the search service 300.

FIG. 3 further shows the inclusion of APIs 330 within search service 300. APIs 330 allow search service 300 to interact with outside services. For example, APIs 330 can be included to allow search service 300 to communicate with a social networking service. The APIs 330 can allow search service 300 to detect a predetermined list of users available for a particular authenticated identity in the social networking service. The APIs 330 can further allow a message to be sent in an appropriate format for the social networking service so that a search query history item can be forwarded to a recipient.

A search engine 340 is also noted in FIG. 3. Search engine 340 does not need to be a part of search service 300. Instead, search engine 340 can be any engine that search service 300 has sufficient access to for providing search queries and receiving back a responsive list of document links.

Figure 4:
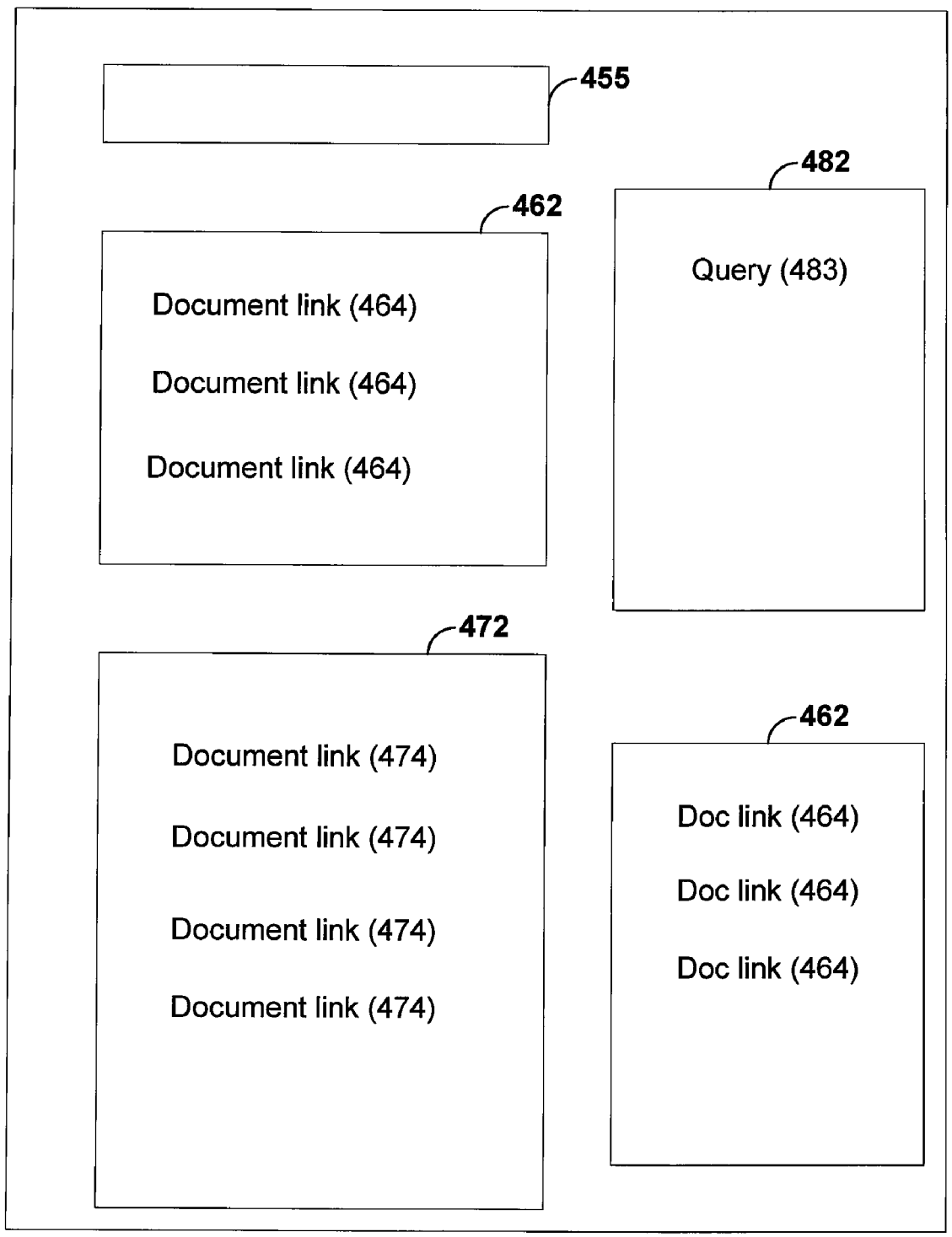
FIG. 4 schematically shows a sample document for displaying search and history items.

FIG. 4 shows an example of a page of search results that are responsive to a search query. Note that in FIG. 4 and subsequent figures, a representation of a displayed page is shown. Any text and/or layout shown on the page is exemplary, and the particular words and/or layout shown are not essential for performing an embodiment of the invention. In FIG. 4, a query interface is provided via a query box 455. Areas 462 correspond to paid advertisement areas. These areas are optional, and include document links 464 that are responsive but that are also based on advertising agreements. Document links 474 are the document links provided by the search engine as being responsive to the query. History module 482 shows the most recent search query 483 submitted by the searcher. Note that only one search query 483 is shown in FIG. 4, for the purposes of clarity. In various embodiments, history module 482 can show up to any desired number of search queries, such as up to 5, or up to 10, or up to another number selected by the user. History module 482 can optionally include a scroll bar to allow review of larger numbers of search queries. History module 482 also includes a button 485 for accessing the main history page. Note that document either document links 474 or document links 464 are potential document links that could be accessed by the searcher as responsive to the search query, and therefore stored as associated with the search query.

Figure 5:
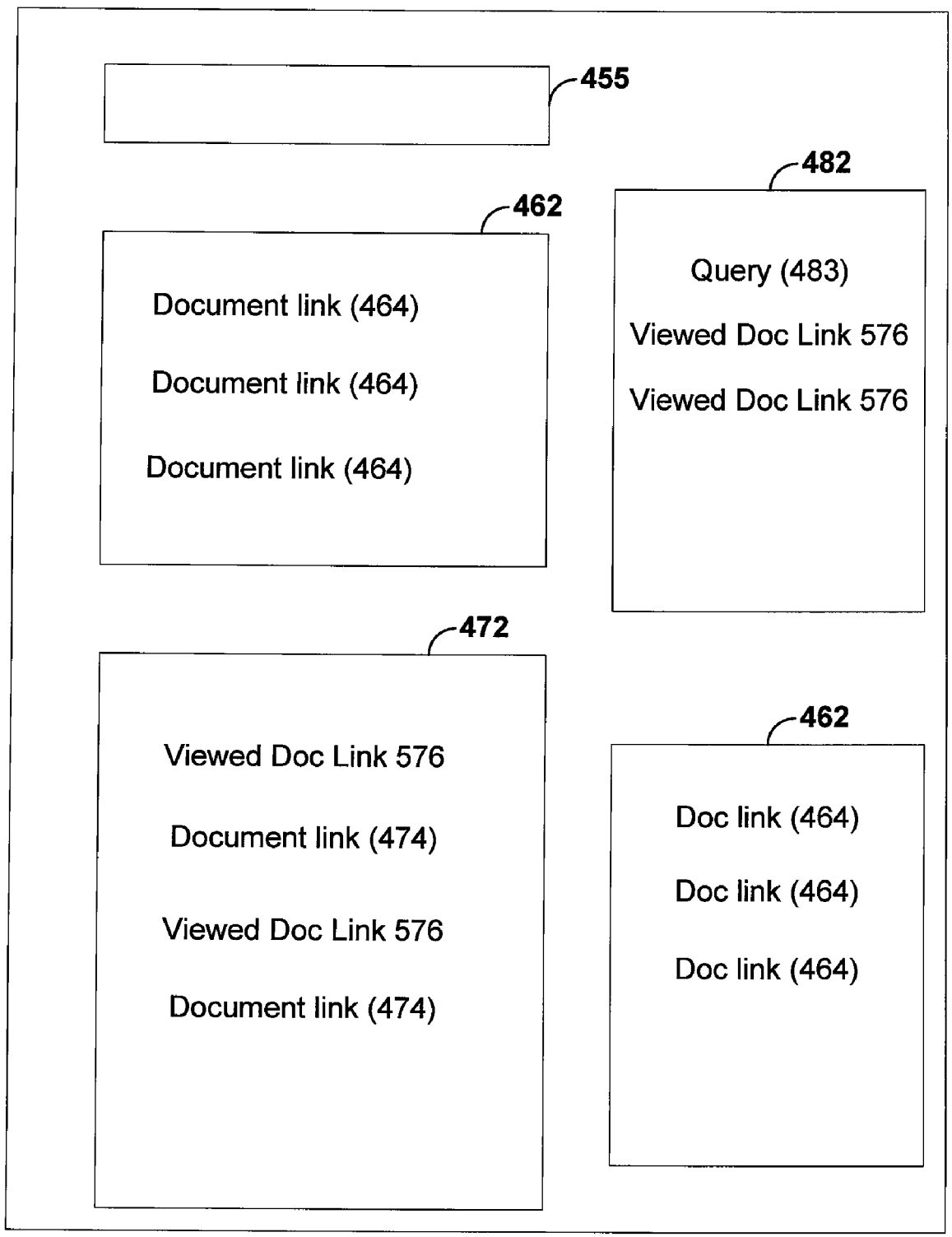
FIG. 5 schematically shows a sample document for displaying search and history items.

FIG. 5 shows a similar page after further searcher activity. In FIG. 4, search results had been returned, but no documents had been viewed by the searcher. FIG. 5 shows the same page after two of the documents were viewed. In FIG. 5, document links 576 are now shown as viewed document links. Those of skill in the art recognize that there are various ways to indicate that a document link has been visited. These viewed document links are now also listed in the history module 582 as document links 576.

Figure 6:
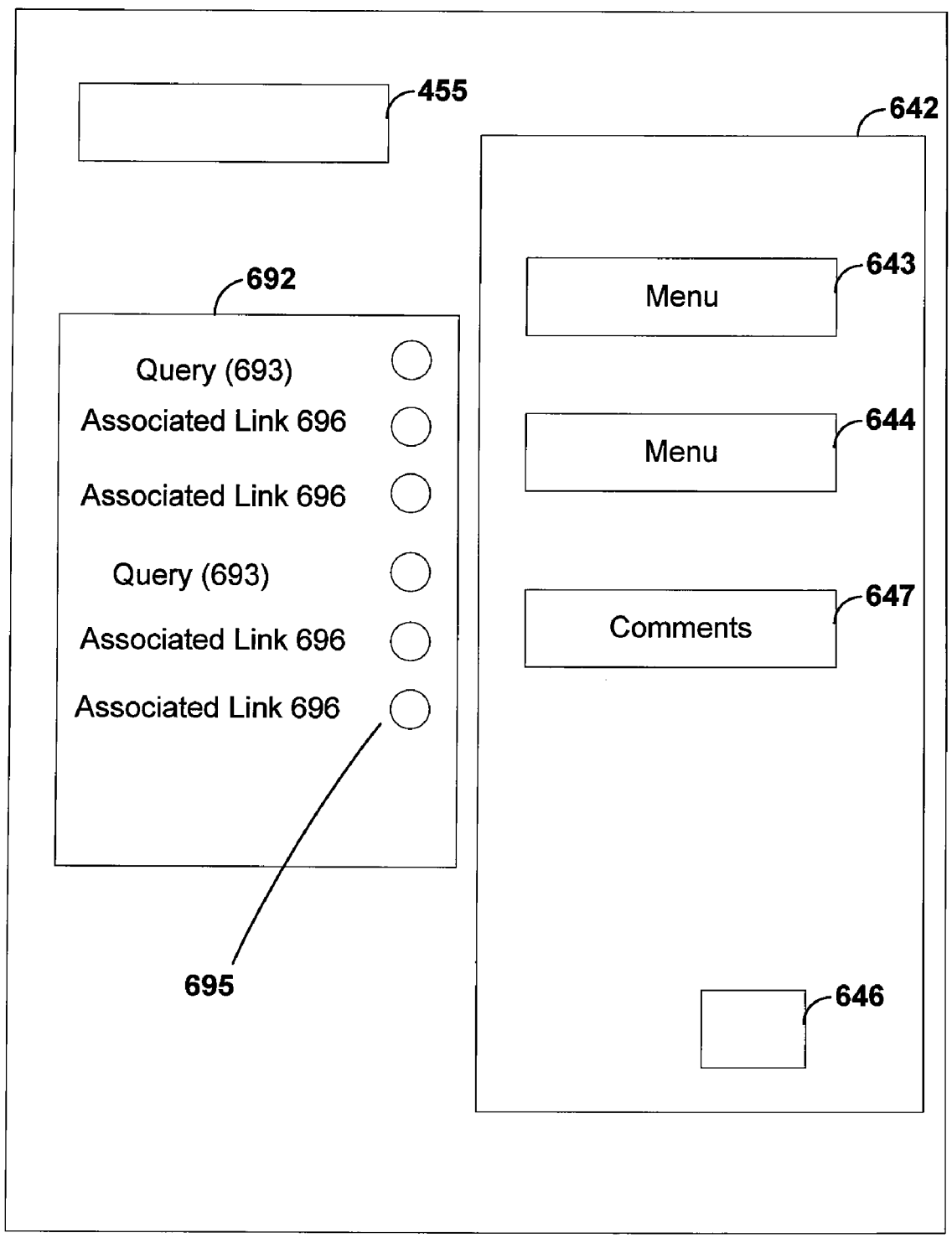
FIG. 6 schematically shows an alternative sample document for displaying search and history items.

FIG. 6 depicts an example of a history page. In FIG. 6, query box 455 is optionally available on the page, such as near the top of the page. Section 642 provides the interface for sharing one or more search items with another searcher. In the embodiment shown in FIG. 6, section 642 includes two drop down menus. The first menu 643 allows selection of a contact from a predetermined list. The second menu 644 allows selection of a query from the previous search queries in the history. In the embodiment shown in FIG. 6, section 642 also includes an action button 646. Action button 646 causes the query (and associated document links) selected in menu 644 to be sent to the contact identified in menu 643. In section 692, search queries 693 that can be selected in menu 643 are displayed along with associated viewed links 696. The queries and associated links in section 692 can be displayed in any convenient format. For example, the queries and associated links can be shown in chronological order based on the most recent query, or chronologically based on the most recently visited page. Alternatively, the first entry could be the most recent query, with additional queries shown based on a relevance to the first entry. Note that on the history page, section 642, section 692, or various other sections of the page can optionally include a scroll bar to allow display of additional information, such as additional queries and associated links.

When a search query 693 is selected in menu 643, all links 696 associated with query 693 are also selected. Optionally, these selections can be modified using selection buttons 695. The action buttons allow links 696 to be removed from association with a query, or allow links from a first query to be associated with a second query. If the selected links are modified, the modified selection of links will be sent a recipient. The modified group of selected links can be saved when the modified selection is sent to a recipient. Alternatively, a separate action button can be provided to allow for saving of the modified selections.

In addition to modifying the selected links, a searcher can optionally add comments regarding either an individual link, or regarding a search query. To add comments regarding a link, a comment button can be used to bring up a dialog box for entering comments. Alternatively, a user modifiable field can be available for each query and/or link in section 692. Similarly, a user modifiable field 647 can be available in section 642 to add or modify comments for a selected query in menu 643.

Figure 7:
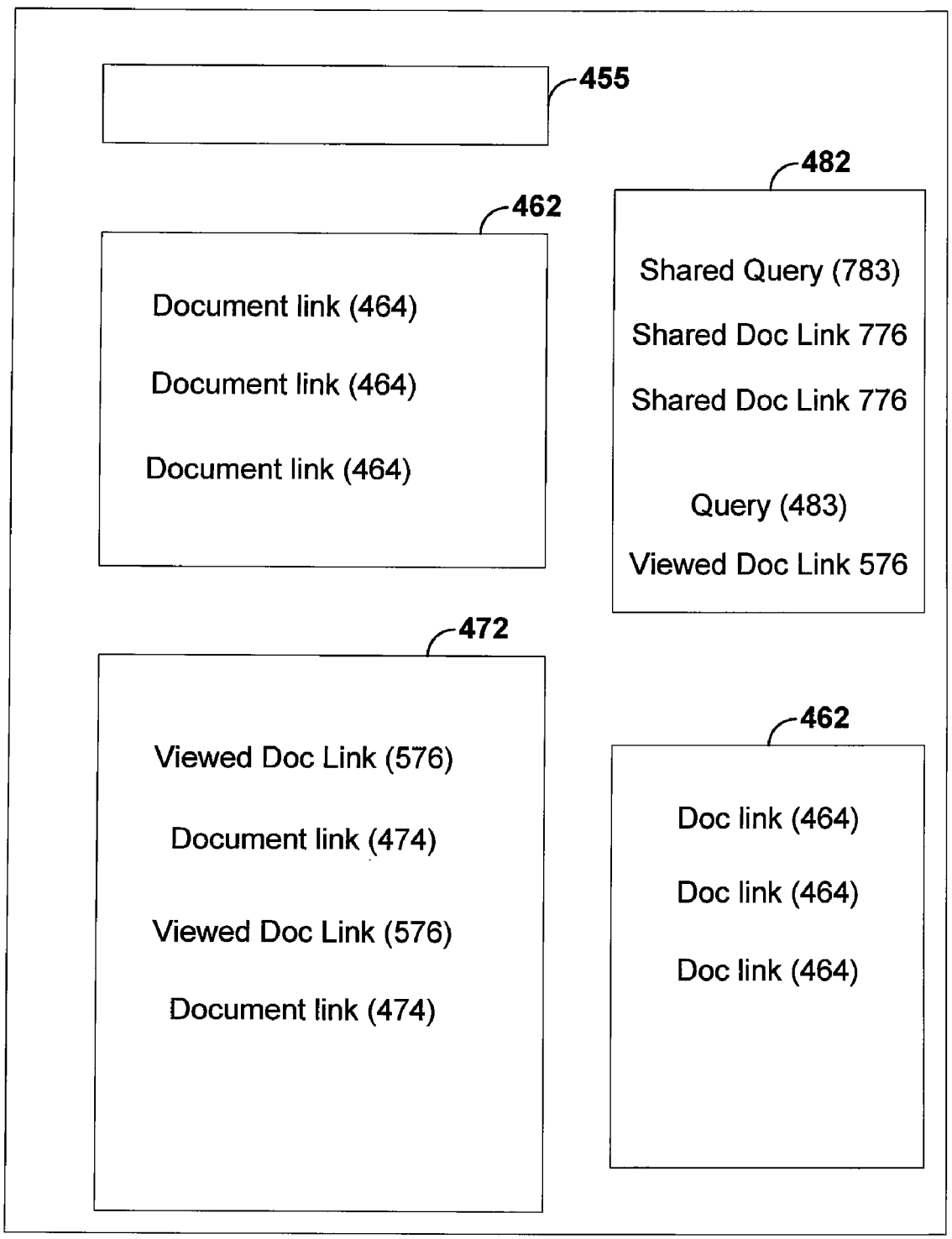
FIG. 7 schematically shows a sample document for displaying search and history items.

After sending search items, the recipient of the history items will be able to review them, such as on the search page of the recipient. FIG. 7 depicts another search page, but this time it is a search page for a second searcher who received a shared history item from the first user. This is indicated at the top of the drawing. In the second searchers search page, the history module 482 includes a shared query 783 and associated document links 776 that represent a search history item forwarded by another searcher. The query 783 and document links 776 can be indicated as items from another searcher by any convenient method. For example, query 783 and document links 776 can be shown in italic text, underline text, or another convenient text format or font difference can be used. Moving the mouse over the link could optionally indicate the searcher who provided the shared history item. Alternatively, the history module 482 could indicate that query 783 and document links 776 are a search history item that has been shared back and forth with another searcher, or possibly with multiple other searchers. A query 483 from the users own search history and an associated document are also shown in the same history module 482.

Figure 8:
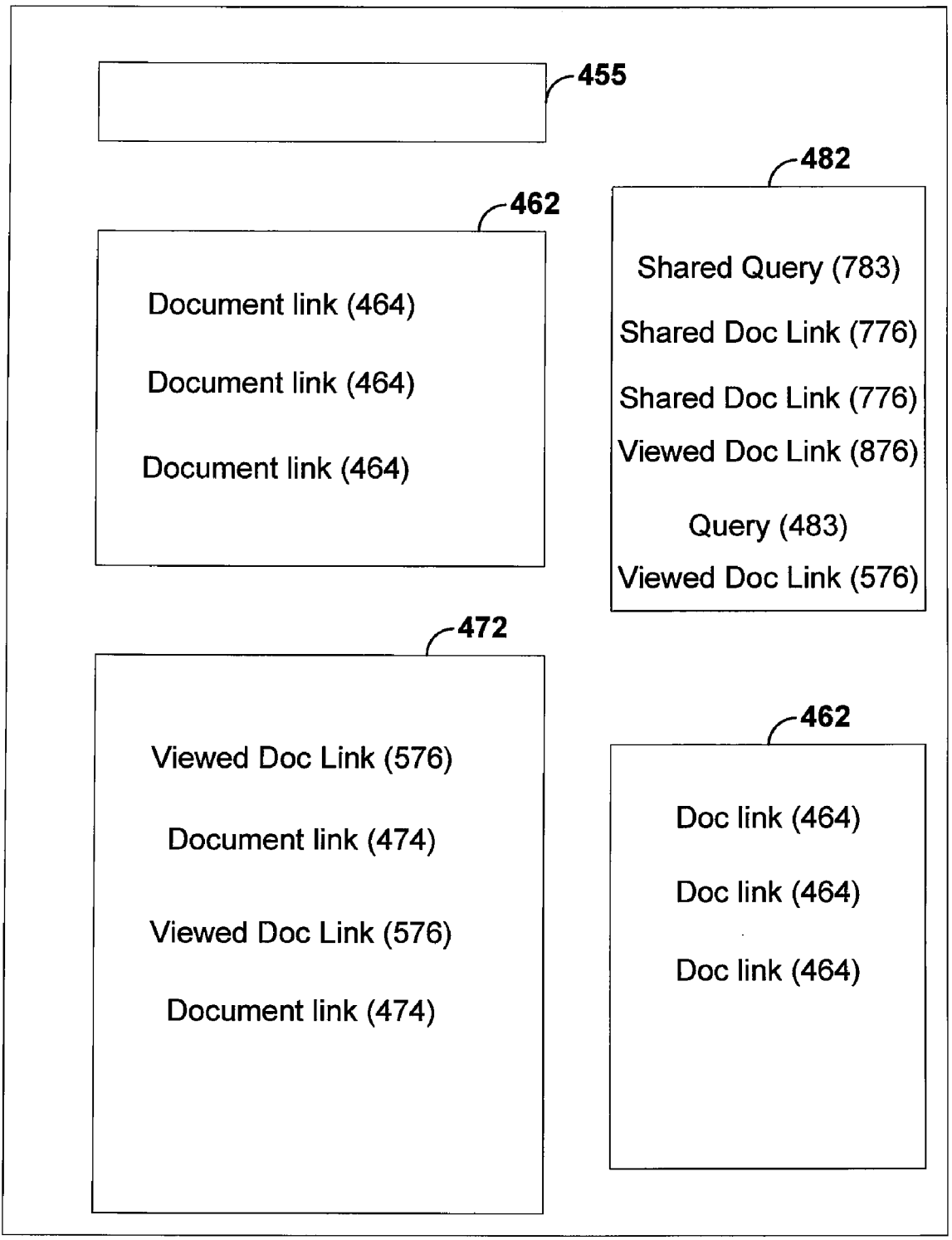
FIG. 8 schematically shows a sample document for displaying search and history items.

After receiving the shared history item, the receiving user can select the shared query and view the search results. If the receiving user selects another document link from the search results, the selected document will be added to the document links associated with the query. This is shown in FIG. 8, where the shared query now has an additional viewed document link 876, to represent the additional document viewed by this second searcher. This newly viewed document link is associated with the shared query, just as it would be with any other search query.

Figure 9:
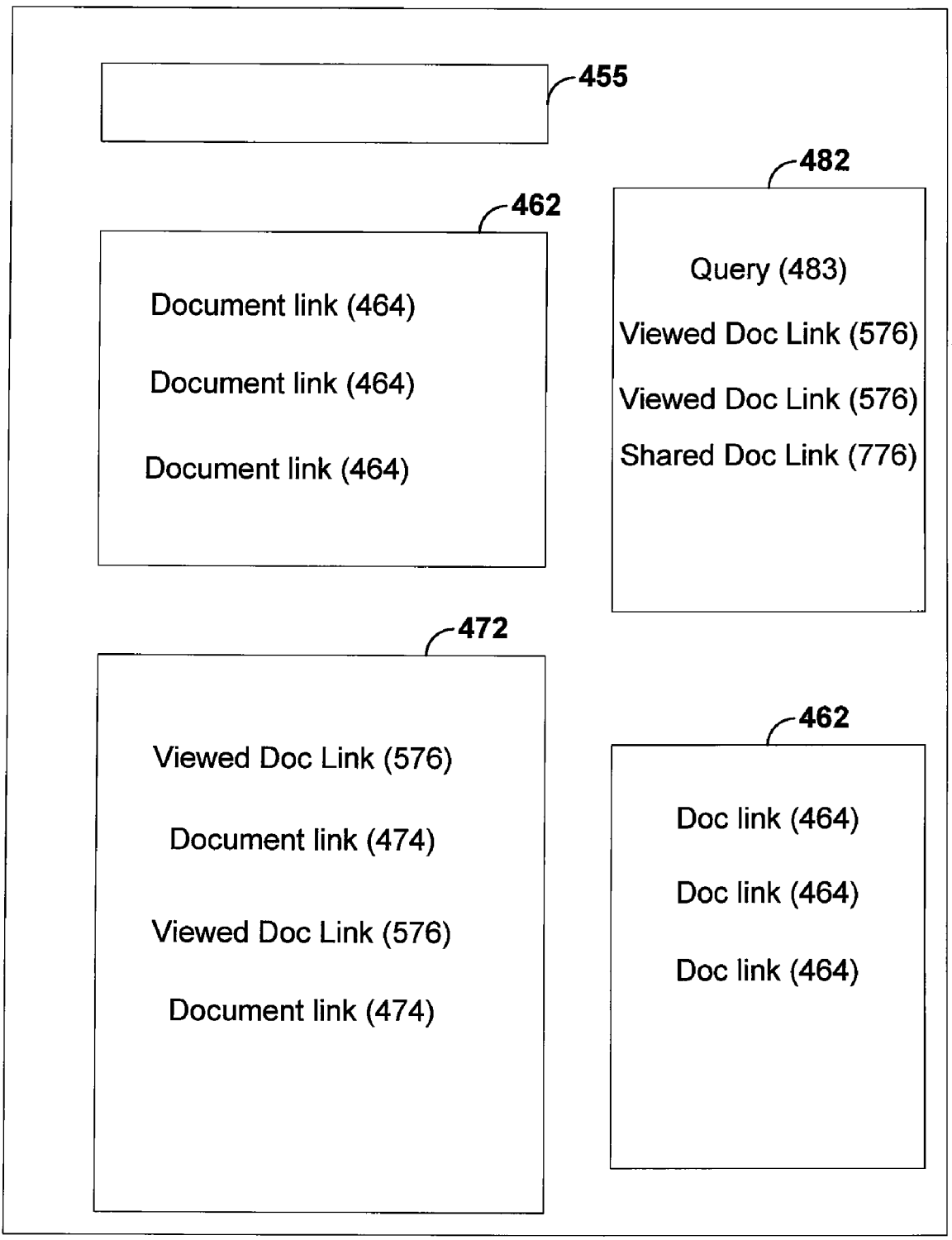
FIG. 9 schematically shows a sample document for displaying search and history items.

To complete the loop for collaboration, the shared history item, including the additional document link viewed by the second searcher, can be shared with the first searcher. This will allow the first searcher to receive the updated information showing the new document link viewed by the second searcher. An example of how this could be displayed is shown in FIG. 9, which shows a search page for the first searcher once again. FIG. 9 is similar to FIG. 5, except that a shared document link 776 is now present in the history module 482. This represents the additional document link that was viewed by the second searcher, and which now has been shared with the first searcher. Optionally, the search query and the document links could all include an indication that the search query 483 is also a shared history item, such as by used of a different font or format. In another embodiment, only shared document link 776 may be shown differently, since query 483 and viewed document links 576 represent items from the first searcher's own history.

Figure 10:
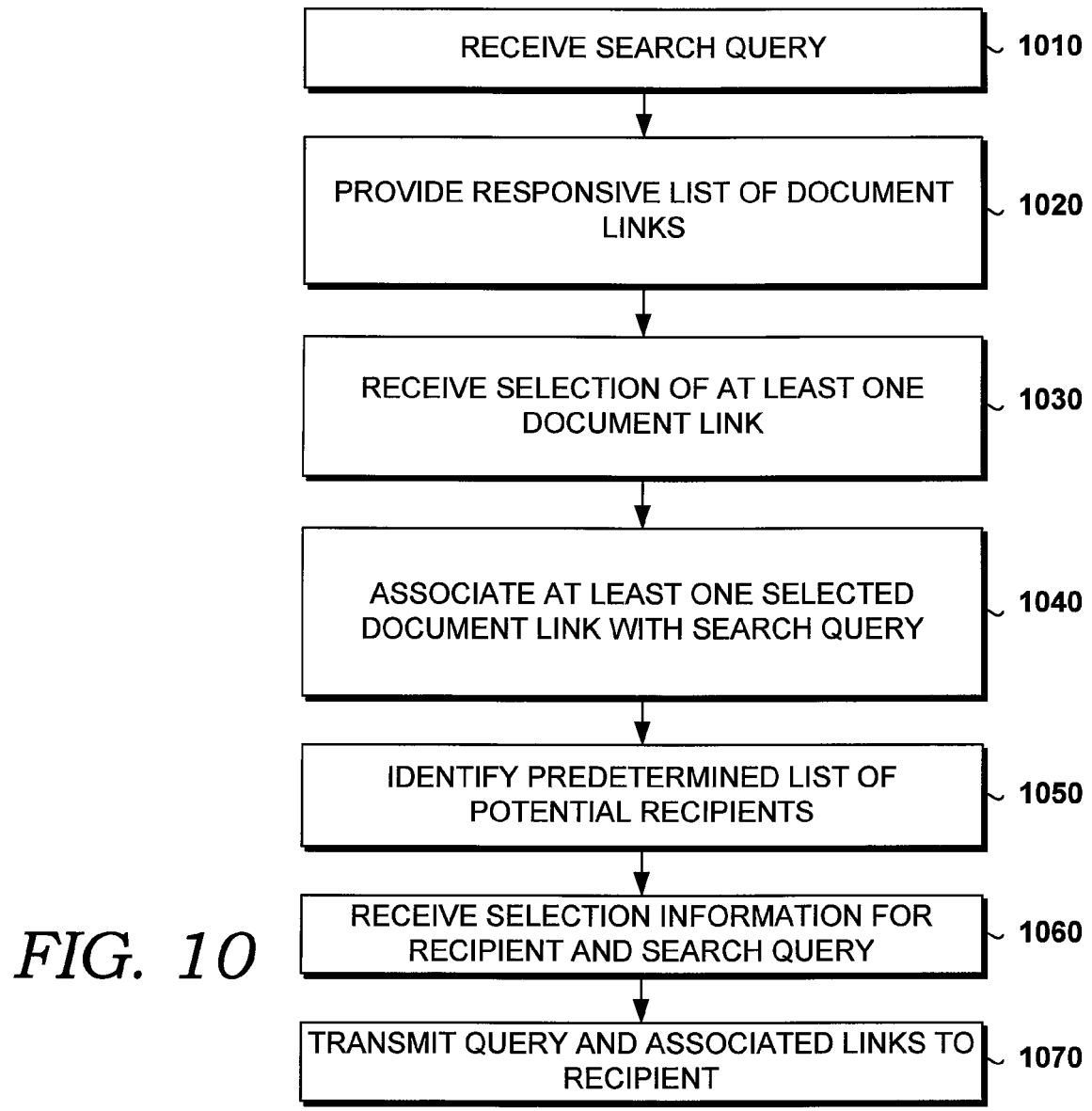
FIG. 10 depicts a flow chart of a method according to an embodiment of the invention.

FIG. 10 depicts a flow chart showing a method according to an embodiment of the invention. In the embodiment shown in FIG. 10, an instance of the search service has already been created. The search service receives a search query 1010 from a searcher. The search service passes the search query to the search engine and receives a listing of responsive document links, which are provided to the searcher 1020. The search service also stores the search query. The search service then receives at least one selection (such as a click-through) of a document link from the searcher 1030. The at least one selected document link is associated with the search query 1040. After receiving the at least one selection of a document link, the search service identifies a predetermined list of potential recipients 1050. This predetermined list can be made available because the searcher authenticated an identity with a third party service, and the predetermined list is identified via an application program interface. Alternatively, the predetermined list can be a list available within the search service, and it is identified when the user authenticates identity with the search service. The search service then receives selection information for a recipient from the predetermined list 1060. Optionally, selection information can also be received for the search query, if more than one query is available in the search history. Note that if the correct recipient and query are already displayed, the selection information for the recipient and query could be the same action as the action to transmit the information. The query and associated document links are transmitted to the recipient 1070.

Figure 11:
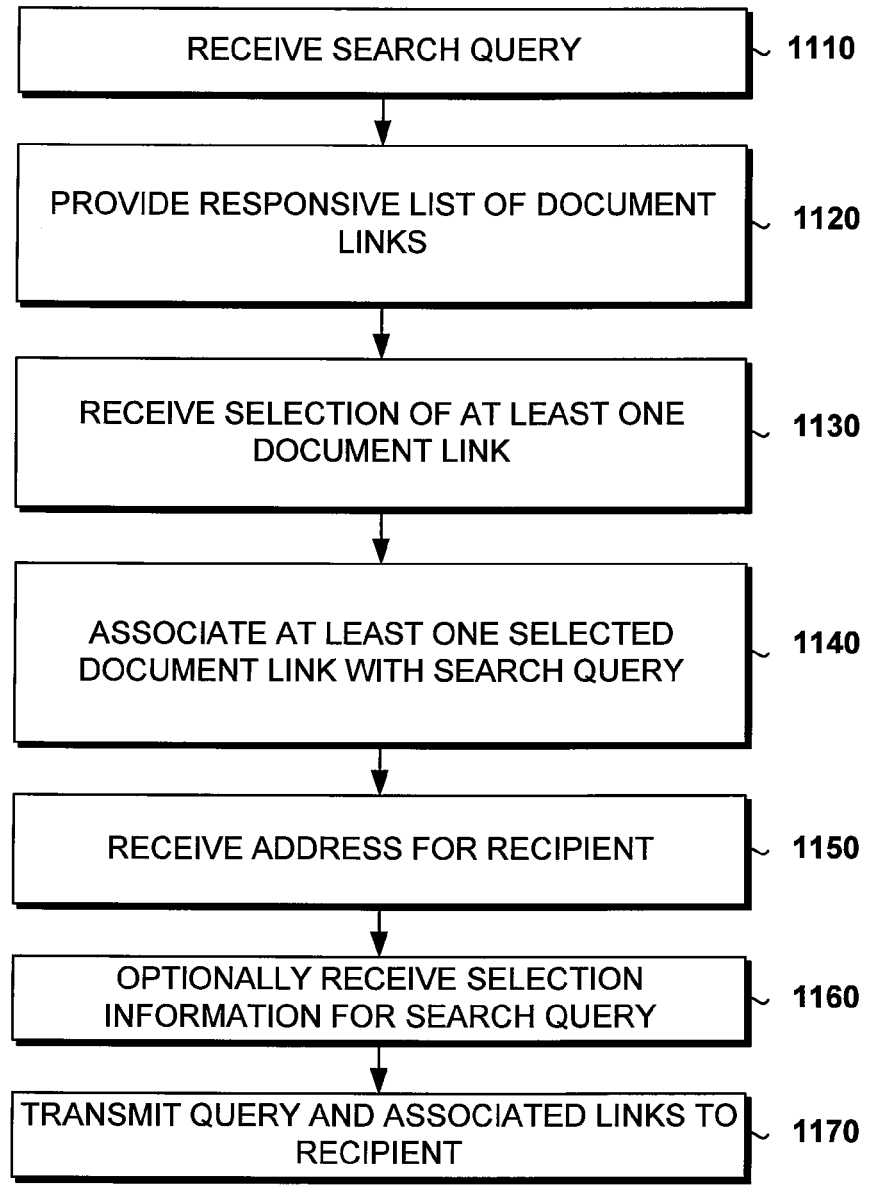
FIG. 11 depicts a flow chart of a method according to an embodiment of the invention.

FIG. 11 depicts a flow chart showing a method according to another embodiment of the invention. In the embodiment shown in FIG. 11, an instance of the search service has already been created. The search service receives a search query 1110 from a searcher. The search service passes the search query to the search engine and receives a listing of responsive document links, which are provided to the searcher 1120. The search service also stores the search query. The search service then receives at least one selection (such as a click-through) of a document link from the searcher 1130. The selected document link is associated with the search query 1140. After receiving the at least one selection of a document link, the search service receives an address for a recipient of search results 1150. The search service then optionally receives selection information for a search query 1160. The query and associated document links are transmitted to the recipient 1170.

Figure 12:
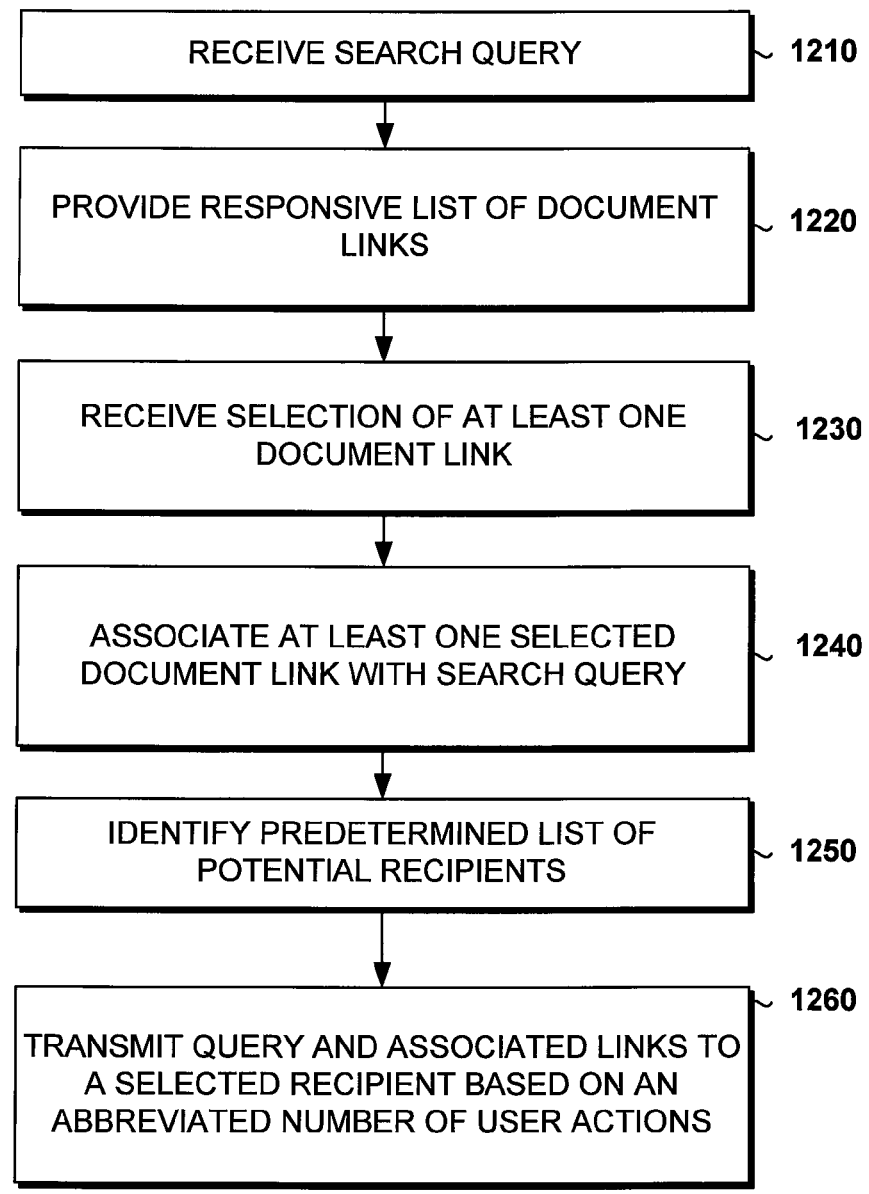
FIG. 12 depicts a flow chart of a method according to an embodiment of the invention.

FIG. 12 depicts a flow chart showing a method according to yet another embodiment of the invention. In the embodiment shown in FIG. 12, an instance of the search service has already been created. The search service receives a search query 1210 from a searcher. The search service passes the search query to the search engine and receives a listing of responsive document links, which are provided to the searcher 1220. The search service also stores the search query. The search service then receives at least one selection (such as a click-through) of a document link from the searcher 1230. The selected document link is associated with the search query 1240. After receiving the at least one selection of a document link, the search service identifies a predetermined list of potential recipients 1250. The search service then transmits the query and history items to a selected recipient based on an abbreviated number of user actions 1260.

In addition to the above embodiments, in another embodiment one or more computer-storage media storing computer-useable instructions that, when executed by a computing device, perform a method for allowing a searcher to share search history information are provided. The computer storage media store computer-usable instructions that include receiving a search query. A plurality of document links responsive to the search query are provided. A selection of at least one provided document link is then received. The at least one selected document link is associated with the search query. Subsequent to receiving the selection of the at least one provided document link, a predetermined potential recipient list is identified. A selection for a recipient from the predetermined recipient list is then received, and the search query and associated at least one document link are transmitted to the selected recipient.

In yet another embodiment, a computer-based method for sharing search history information without requiring authentication by a searcher is provided. The computer-based method includes receiving a search query. A plurality of document links responsive to the search query are provided. A selection of at least one provided document link is then received. The at least one selected document link is associated with the search query. An address corresponding to a recipient identity at a computer based service is received subsequent to receiving the selection of the at least one provided document link. The search query and associated at least one document link are transmitted to the received address.

In still another embodiment, one or more computer-storage media storing computer-useable instructions that, when executed by a computing device, perform a method for allowing a searcher to share search history information with an abbreviated number of actions are provided. The computer storage media store computer-useable instructions that include receiving a search query. A plurality of document links responsive to the search query are provided. A selection of at least one provided document link is then received. The at least one selected document link is associated with the search query. A predetermined potential recipient list is identified subsequent to detection of access to the at least one document link. The search query and associated at least one document link are transmitted to a recipient from the predetermined potential recipient list based on an abbreviated number of received user actions subsequent to identifying the predetermined recipient list.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A computer-based method for allowing a searcher to share search history information comprising:
   receiving a search query;
   providing a plurality of document links responsive to the search query;
   receiving a selection of at least one provided document link;
   associating the at least one selected document link with the search query;
   storing the search query and associated at least one document link in an outside recipient data location;
   associating the stored search query and associated at least one document link with an identifier;
   identifying a predetermined potential recipient list subsequent to receiving the selection of the at least one provided document link;
   receiving a selection for a recipient from the predetermined recipient list;
   transmitting a shared history document link to the selected recipient, the shared history document link corresponding to a document that includes the search query and associated at least one document link; and
   using the identifier to locate the stored search query and associated document links when the shared history document link is accessed.

2. The computer-based method according to claim 1, wherein the shared history document link includes the identifier.

3. The computer-based method according to claim 1, further comprising:
   receiving additional information corresponding to the search query; and
   storing the additional information as associated with the search query.

4. The computer-based method according to claim 3, wherein the stored additional information is transmitted to the selected recipient.

5. The computer-based method according to claim 1, wherein the predetermined potential recipient list is identified after the searcher authenticates an identity with a service that includes the predetermined recipient list.

6. The computer-based method according to claim 5, further comprising:
   receiving from the selected recipient the transmitted search query and one or more additional document links different from the associated at least one document link;
   associating the one or more additional document links with the search query; and
   displaying the search query, the associated at least one document link, and the one or more additional document links.

7. A computer-based method for sharing search history information without requiring authentication by a searcher comprising:
   receiving a search query;
   providing a plurality of document links responsive to the search query;
   receiving a selection of at least one provided document link;
   associating the at least one selected document link with the search query;
   storing the search query and associated at least one document link in an outside recipient data location;
   associating the stored search query and associated at least one document link with an identifier;
   receiving an address corresponding to a recipient identity at a computer based service subsequent to receiving the selection of the at least one provided document link;
   transmitting a shared history document link to the selected recipient, the shared history document link corresponding to a document that includes the search query and associated at least one document link; and
   using the identifier to locate the stored search query and associated document links when the shared history document link is accessed.

8. The computer based method according to claim 7, wherein the shared history document link includes the identifier.

9. The computer based method according to claim 7, further comprising:
   receiving additional information corresponding to the search query; and
   storing the additional information as associated with the search query.

10. The computer based method according to claim 9, wherein the stored additional information is transmitted to the selected recipient.

11. A computer-based method for allowing a searcher to share search history information with an abbreviated number of actions, the method comprising:
    receiving a search query;
    providing a plurality of document links responsive to the search query;
    receiving a selection of at least one provided document link;
    associating the at least one selected document link with the search query;
    storing the search query and associated at least one document link in an outside recipient data location;
    associating the stored search query and associated at least one document link with an identifier;
    identifying a predetermined potential recipient list subsequent to detection of access to the at least one document link;
    transmitting a shared history document link to a recipient from the predetermined potential recipient list based on an abbreviated number of received user actions subsequent to identifying the predetermined recipient list, the shared history document link corresponding to a document that includes the search query and associated at least one document link; and using the identifier to locate the stored search query and associated document links when the shared history document link is accessed.

12. The computer-based method of claim 11, wherein the abbreviated number of received user actions consists essentially of:

receiving a selection of the recipient from the predetermined potential recipient list; and receiving a user action requesting transmittal of the search query and associated document links to the selected recipient.

13. The computer-based method of claim 11, wherein the abbreviated number of received user actions consists essentially of:

receiving a user action to display a history interface;

receiving a selection of the recipient from the predetermined potential recipient list; and receiving a user action requesting transmittal of the search query and associated document links to the selected recipient.

14. The computer-based method of claim 11, wherein the abbreviated number of received user actions consists essentially of:

receiving a selection of the recipient from the predetermined potential recipient list;

receiving a user action requesting storing of the search query and associated document links; and receiving a user action requesting transmittal of the search query and associated document links to the selected recipient.

15. The computer-based method of claim 11, wherein the abbreviated number of received user actions consists essentially of:

receiving a user action to display a history interface;

receiving a selection of the recipient from the predetermined potential recipient list;

receiving a user action requesting storing of the search query and associated document links; and receiving a user action requesting transmittal of the search query and associated document links to the selected recipient.

16. The computer-based method according to claim 11, wherein the predetermined potential recipient list is identified after the searcher authenticates an identity with a service that includes the predetermined recipient list.

* * * * *